Aug. 9, 1949.                E. R. HOLMES                2,478,581
              SHUTTLE DRIVE FOR NARROW WARE LOOMS
                        Filed Aug. 5, 1947
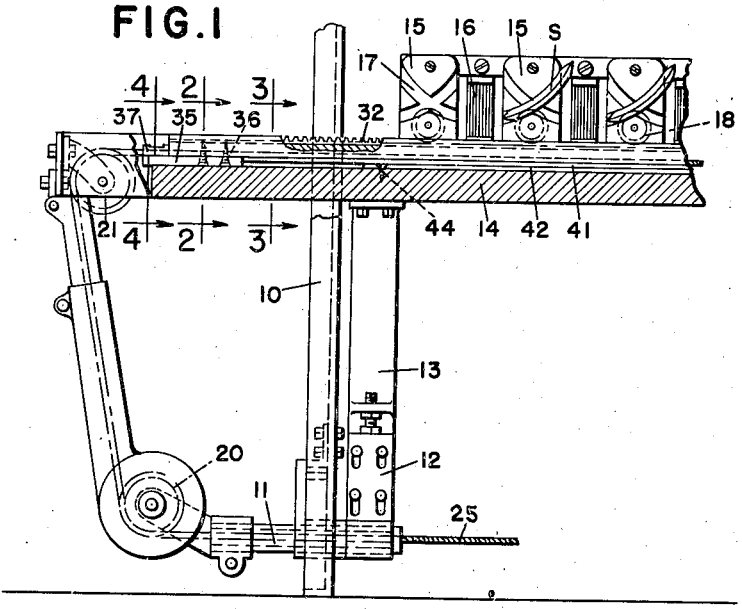
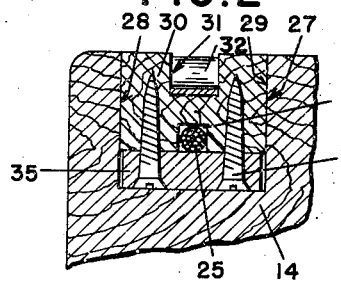
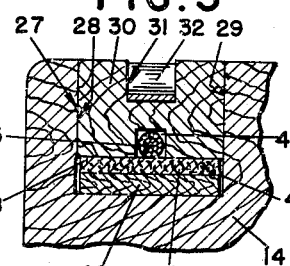
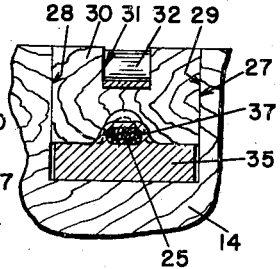
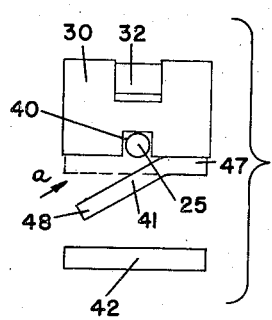
INVENTOR
ELBRIDGE R. HOLMES
Chas. T. Hawley
ATTORNEY Patented Aug. 9, 1949

2,478,581

UNITED STATES PATENT OFFICE 2,478,581

SHUTTLE DRIVE FOR NARROW WARE LOOMS

Elbridge R. Holmes, Worcester, Mass., assignor to Crompton & Knowles Loom Works, Worcester, Mass., a corporation of Massachusetts Application August 5, 1947, Serial No. 766,307

10 Claims. (Cl. 139—136)

1

This invention relates to improvements in shuttle driving mechanism for narrow ware looms and it is the general object of the invention to provide improved means for operating the rack rod which meshes with the shuttle driving pinions.

The shuttles in narrow ware looms are ordinarily driven by pinions which mesh with racks on the shuttles and also with a rack rod extending lengthwise of the lay and reciprocated during loom operation to move the shuttles first in one direction and then in the other. In the past it has been customary to drive the rack rod by means of chains or the like connected to its ends. Due to changes in humidity and temperature the length of the rack rod alters sufficiently to interfere with correct operation of the driving chains. If the rack rod contracts the chains are too tight and if it expands the chains will be too slack.

It is an important object of the present invention to provide driving means for the rack rod including a closed metallic system which will not be effected to any appreciable extent by humidity or temperature changes and fasten the rack to the system at one point, such as at one end thereof. With this construction slight changes in the length of the rack rod will not affect the rack rod driving mechanism.

In carrying the invention into effect I contemplate the use of a cable or the like extending the full length of the lay and swinging backwardly and forwardly with the latter and also having a reciprocating motion. The rack rod is customarily located in a slot formed in the top of the lay beam, but if the cable or similar flexible metallic drive member is able to engage the walls of the slot undue wear of the latter will result because of the backward and forward movement of the lay as the cable moves lengthwise thereof. To prevent this wear it is another object of the invention to construct the rack rod so it will keep the cable out of engagement with those parts of the lay defining the aforesaid slot.

As the rack reciprocates during loom operation it is likely to develop considerable heat and it is another object of the invention to secure an antifriction strip to the rack rod and dispose it in such relation with respect to the rack rod as to close a cable receiving slot in the rack rod.

With these and other objects in view which will appear as the description proceeds, my invention resides in the combination and arrangement of parts hereinafter described and set forth.

In the accompanying drawings, wherein a convenient embodiment of my invention is set forth,

2

Fig. 1 is a front elevation partly in section of the left end of the lay of a narrow ware loom having the invention applied thereto, Figs. 2, 3 and 4 are enlarged transverse vertical sections on lines 2—2, 3—3 and 4—4, respectively, of Fig. 1, Fig. 5 is a diagrammatic view showing a step in the assembly of the rack rod, and Fig. 6 is a diagrammatic view of the rack rod operating mechanism.

Referring to Fig. 1, the loom frame 10 supports a rocker shaft 11 which is preferably hollow and has mounted thereon a foot 12 of a lay sword 13. The latter supports a lay beam 14 extending across the loom and having mounted thereon shuttle blocks 15 between which are located reeds 16. The shuttles S are in the present instance curved and fit guide slots 17 in the blocks 15. Pinions 18 are mounted on the lay, one for each shuttle block. When the pinions rotate they cause movement of the shuttles across the reed spaces from one block to another. The lay is reciprocated backwardly and forwardly by mechanism not shown but well understood, the shuttles being in the position shown in Fig. 1 when the lay is at the forward part of its stroke and being moved by their pinions across their corresponding reed spaces when the lay is near the back part of its stroke.

The rocker shaft 11 has mounted thereon a pulley 20 and the lay carries a second pulley 21, these two pulleys accommodating a flexible drive member which in the past has frequently been a chain. The opposite or right end of the lay will be substantially the same as that already described and the construction may be similar to those set forth in my prior Patents Nos. 1,766,903; 1,807,739; and 1,811,432.

In carrying my present invention into effect I provide a continuous flexible actuator 25 which may be a stranded metallic wire cable. As shown diagrammatically in Fig. 6 the cable has its ends connected to a driving mechanism D which may be of any approved form, as shown for instance in the second and third of the previously mentioned patents. The cable extends to the left from this mechanism D around left hand pulley 20, upwardly and around left hand pulley 21, then across the lay to the right hand pulley 21 and down to the right hand lower pulley 20 and back to the mechanism D. The cable 25 therefore forms in effect a closed power or actuator ring or system which is reciprocated by the mechanism D to which it is connected.

The lay beam is provided with an upwardly opening slot 27 having front and back walls 28 and 29, respectively. Within this slot is located a rack rod 30 made preferably of wood and having a slot 31 in the upper face thereof in which is glued or otherwise secured a wooden rack 32. This rack meshes with the previously described pinions 18 and causes turning of the latter as the rack reciprocates in slot 27.

A metallic connector or block 35 is connected by screws 36 to the under side of the left end of the rack 30, see Figs. 1 and 2. As shown in Fig. 4 block 35 is provided with a clip or the like 37 which is forced down into tight holding relation with the cable 25 to cause the block 35 to move with the cable. While Fig. 4 shows one form of connecting the block to the cable I do not wish to be limited to this single means for operatively connecting these two parts.

Extending upwardly into the under side of the rack 30 is a lengthwise slot 40 through which the cable 25 extends. An anti-friction bearing member or strip 41, which may be made of leather or other suitable material, is glued or otherwise suitably secured to the under side of the rack 30 and extends across the slot 40 to close the bottom of the latter and thus confine part of the cable 25. The lay is provided with a support plate 42 which may be made of wood and located in the bottom of slot 27. This strip of wood is preferably secured to the lay beam at one end only thereof, as by a screw 44. With this construction the right end of the support plate will be free to move slightly relatively to the beam should its length be altered by humidity or temperature changes. As shown in Fig. 1 the left end of the support 42 is spaced from the actuator block 35 to permit the latter to reciprocate in the bottom of the left end of slot 27 sufficiently to shift the shuttles from one block 15 to another.

The manner of attaching the anti-friction member 41 to the under side of the rack rod is illustrated in Fig. 5, where it will be apparent that the right edge 47 of strip 41 is secured lengthwise to the right part of the under surface of the rack rod. The cable is then inserted into the slot 40 by moving upwardly in the direction of arrow $a$, Fig. 5, after which the strip 41 is raised to the dotted line position so that its rear edge 48 can be secured to the rear part of the bottom of the rack rod. While I have found this a convenient way of assembling the rack rod in such manner as to inclose part of the cable 25 I do not wish thus to be limited.

During loom operation the mechanism D causes that part of the cable extending along the lay to move first to the right and then to the left for the purpose of reciprocating the rack rod and oscillating the pinions to drive the shuttles. If the length of the rack rod should change as already mentioned such a change will have no effect on the actuating cable, since the latter together with the mechanism D in effect provides a closed metallic actuating ring the length of which is not altered materially by changes in humidity and temperature. In the event that repairs are necessary the cable can have its ends disconnected from the mechanism D and the rack rod lifted from the lay slot 27, after which the leather strip 41 can be removed to afford access to the cable if this is necessary.

From the foregoing it will be seen that I have provided shuttle driving mechanism for narrow ware looms including a substantially closed metallic actuating system including a cable partly inclosed within the rack rod. When thus located the cable is kept out of engagement with the side walls 28 and 29 of the lay slot 27 and cannot cause wear of the parts of the slot which guide the rack rod. Since the cable and rack move together they have no relative endwise movement to cause wearing of the slot 40 in the bottom of the rack rod or the anti-friction member 41. Furthermore, the anti-friction member 41 serves to close the bottom of the slot 40 and thus inclose that part of the cable within the rack rod.

Having thus described my invention it will be seen that changes and modifications may be made therein by those skilled in the art without departing from the spirit and scope of the invention and I do not wish to be limited to the details herein disclosed, but what I claim is:

1. In shuttle driving mechanism for a narrow ware loom having a lay provided with a lengthwise slot, a two part rack rod movable in said slot, one part for actuating the shuttles of the loom and the other part serving as a bearing, and an actuator for the rack rod including a flexible element part of which is inclosed within the rack rod and operatively connected thereto.

2. In shuttle driving mechanism for a narrow ware loom having a lay provided with a lengthwise slot, a rack rod movable in said slot comprising an upper shuttle actuating part and a lower bearing member, and an actuator for the rack rod including a flexible element operatively connected to the rack rod and having part thereof inclosed within and extending through the rack rod.

3. In shuttle driving mechanism for a narrow ware loom having a lay provided with a lengthwise slot, a rack rod movable in said slot, an anti-friction member secured to the underside of the rack rod, and an actuator for the rack rod including a flexible element operatively connected to the rack rod and extending through the latter above said anti-friction member.

4. In shuttle driving mechanism for a narrow ware loom having a lay provided with a lengthwise slot, a rack rod movable in said slot, actuator means for the rack rod including a drive mechanism and a flexible metallic element having its ends connected to said mechanism and having part thereof extending through the rack rod, said rack rod being so constructed as to keep all parts of the flexible element extending through the rack rod out of engagement with the lay, and operative connections between said rack rod and said flexible element.

5. In shuttle driving mechanism for a narrow ware loom having a lay provided with a lengthwise slot and guide pulleys, a rack rod reciprocable in said slot, actuator means for the rack rod including a drive mechanism and a flexible metallic element reciprocated by said drive mechanism and trained around said pulleys and having part thereof extending through said rack rod, said rack rod being so constructed as to keep all parts of the flexible element extending through the rack rod out of engagement with the lay, and operative connections between said rack rod and said flexible element.

6. In shuttle driving mechanism for a narrow ware loom having a lay provided with a lengthwise slot, a rack rod adapted for movement in said slot, said rack rod having a downwardly opening slot extending along the bottom thereof, an actuator for the rack rod including a flexible element extending through the downwardly opening slot in said rack rod, an anti-friction member under said flexible element secured to the rack rod along one side only of the slot in the rack rod and deflectable downwardly from the rack rod to afford entry of the flexible element into and removal thereof from the slot in the rack rod, and means operatively connecting the rack rod to said flexible element.

7. In shuttle driving mechanism for a narrow ware loom having a lay provided with a lengthwise slot, a rack rod movable in said slot and having a slot extending lengthwise thereof, an anti-friction member secured to the rack rod extending therealong and extending across said slot, and a flexible actuator element operatively connected to the rack rod and extending through the slot in the rack rod.

8. In shuttle driving mechanism for a narrow ware loom having a lay provided with a lengthwise slot, a rack rod movable in said slot and having a slot extending lengthwise thereof, a flexible actuator element operatively connected to the rack rod and extending through the slot in the rack rod, and an anti-friction member secured to and extending along the rack rod and together with the latter inclosing that part of the flexible member within the slot in the rack rod.

9. In shuttle driving mechanism for a narrow ware loom having a lay provided with a lengthwise slot, a rack rod movable in said slot and having a downwardly opening slot extending longitudinally thereof, an actuator means including a drive mechanism and a cable having its ends connected to the mechanism and having a part thereof in said slot in the rack rod extending along the lay in said slot, and a strip of anti-friction material located in said lengthwise slot in the lay and secured to said rack rod below said cable.

10. In shuttle driving mechanism for a narrow ware loom having a lay provided with a lengthwise slot, an actuator means including a drive mechanism and a cable having its ends connected to the mechanism and having a part thereof extending along the lay, and a rack rod located in the slot and operatively connected to said cable and effective to keep said cable out of contact with those parts of the lay defining said slot.

ELBRIDGE R. HOLMES.

REFERENCES CITED

The following references are of record in the file of this patent:

UNITED STATES PATENTS

| Number | Name | Date |
|---|---|---|
| 54,742 | Knowles | May 15, 1866 |
| 69,708 | Rushworth | Oct. 8, 1867 |
| 1,048,540 | Hutchins | Dec. 31, 1912 |

FOREIGN PATENTS

| Number | Country | Date |
|---|---|---|
| 49,253 | Switzerland | Nov. 2, 1909 |
| 404,431 | Great Britain | Jan. 18, 1934 |